United States Patent
Hara et al.

(10) Patent No.: US 8,159,851 B2
(45) Date of Patent: Apr. 17, 2012

(54) MATRIX CONVERTER

(75) Inventors: Hidenori Hara, Fukuoka (JP); Eiji Yamamoto, Fukuoka (JP); Takahiro Uchino, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 212 days.

(21) Appl. No.: 12/690,088

(22) Filed: Jan. 19, 2010

(65) Prior Publication Data

US 2010/0118570 A1 May 13, 2010

Related U.S. Application Data (63) Continuation of application No. PCT/JP2008/062169, filed on Jul. 4, 2008.

(30) Foreign Application Priority Data

Jul. 20, 2007 (JP) ................................. 2007-189921

(51) Int. Cl.
   *H02M 5/02* (2006.01)
(52) U.S. Cl. ........................................ 363/164; 363/159
(58) Field of Classification Search .................. 363/157, 363/159, 163, 164
   See application file for complete search history.

(56) References Cited

U.S. PATENT DOCUMENTS

| 7,701,740 | B2* | 4/2010 | Yamanaka | 363/149 |
|---|---|---|---|---|
| 7,821,802 | B2* | 10/2010 | Odaka et al. | 363/159 |
| 7,881,087 | B2* | 2/2011 | Sakakibara | 363/159 |
| 2008/0291698 | A1 | 11/2008 | Yamamoto et al. | |
| 2009/0091954 | A1 | 4/2009 | Yamanaka | |

FOREIGN PATENT DOCUMENTS

| JP | 2005-295640 | 10/2005 |
|---|---|---|
| JP | 2007-116856 | 5/2007 |
| WO | WO 2006-118026 | 11/2006 |

* cited by examiner

*Primary Examiner* — Adolf Berhane
*Assistant Examiner* — Fred E Finch, III
(74) *Attorney, Agent, or Firm* — Ditthavong Mori & Steiner, P.C.

(57) ABSTRACT

A matrix converter includes a matrix converter main circuit, an input voltage detector group configured to detect an input voltage of an alternating current source, a gate driver configured to drive a bidirectional switch, and a controller having a pulse width modulation operation unit and a commutation operation unit. The pulse width modulation operation unit is configured to fix one output phase in a conduction state, configured to pulse-width-modulate one of remaining two output phases by using all three input phases, and configured to pulse-width-modulate the other output phase by using only two input phases of a reference input voltage and a middle input voltage.

7 Claims, 7 Drawing Sheets

MATRIX CONVERTER

CROSS REFERENCES TO RELATED APPLICATIONS

The present application is a continuation application of PCT/JP2008/062169, filed Jul. 4, 2008, which claims priority to Japanese Patent Application No. 2007-189921, filed Jul. 20, 2007. The contents of these applications are incorporated herein by reference in their entirety.

BACKGROUND OF THE INVENTION

1. Field of the Invention

The present invention relates to a matrix converter.

2. Discussion of the Background

Japanese Unexamined Patent Application Publication No. 2005-295640 (US patent family member US20080291696 (published), UK patent family member UK-P-2429799 (registered)) discloses a pulse width modulation (PWM) cycloconverter that accurately generates voltage even though a voltage command is low.

SUMMARY OF THE INVENTION

According to one aspect of the present invention, a matrix converter includes a matrix converter main circuit in which phases of an alternating current source are directly connected to their corresponding phases on an output side by a bidirectional switch having a self-arc-extinguishing capability, an input voltage detector group configured to detect an input voltage of the alternating current source, a gate driver configured to drive the bidirectional switch, and a controller having a pulse width modulation operation unit and a commutation operation unit. The pulse width modulation operation unit is configured to fix one output phase in a conduction state, configured to pulse-width-modulate one of remaining two output phases by using all three input phases, and configured to pulse-width-modulate the other output phase by using only two input phases of a reference input voltage and a middle input voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

A matrix converter is an alternating current to alternating current (AC/AC) direct converter. The matrix converter is also referred to as a pulse width modulation (PWM) cycloconverter.

Figure 1:
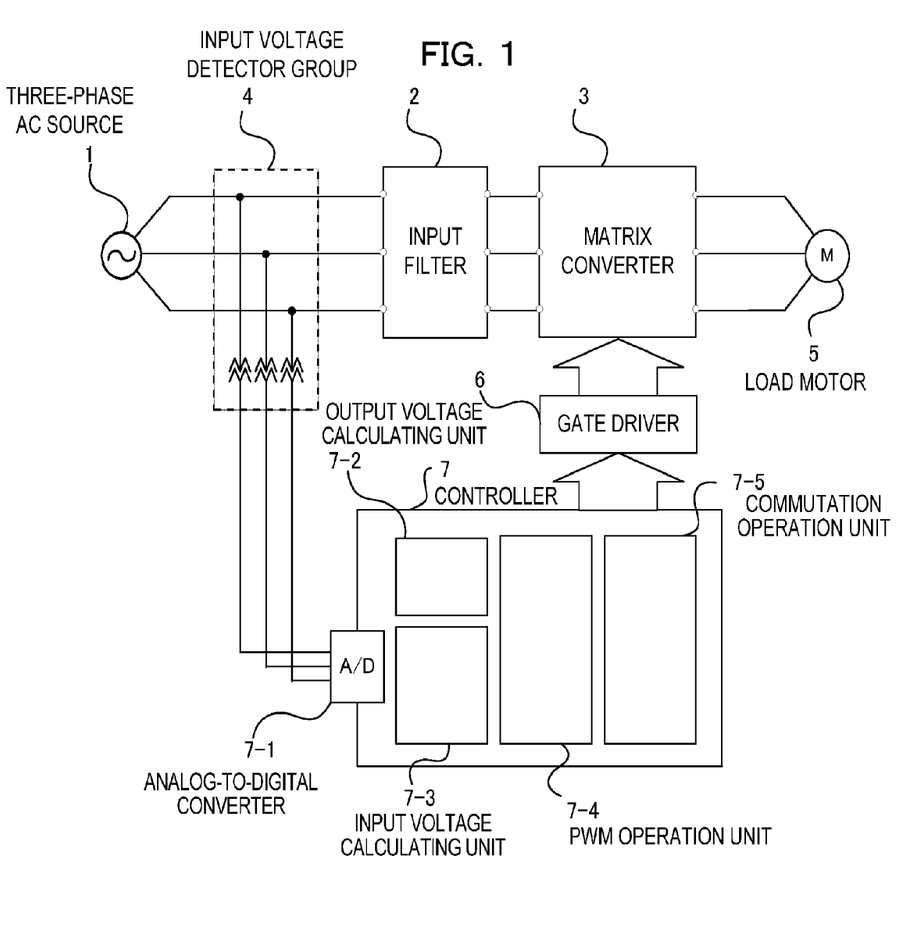
FIG. 1 illustrates a configuration of a matrix converter circuit according to an embodiment of the present invention.
Figure 2:
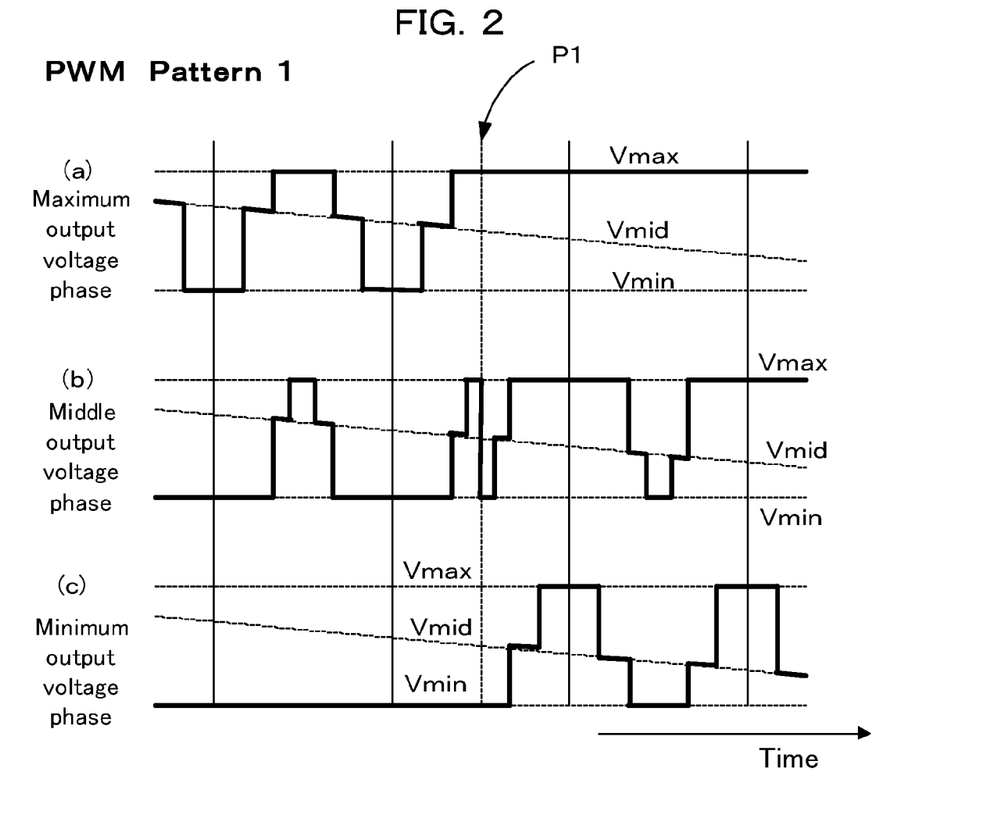
FIG. 2 shows a PWM pattern 1 (first mode) representing switching waveforms of the related art.

FIG. 2 shows a PWM pattern 1 (first mode) representing switching waveforms. FIG. 2(a) to FIG. 2(c) each represent an output voltage signal generated by a matrix converter main circuit 3 and output to a load motor 5 (see FIG. 1).

In FIG. 2, the horizontal axis represents time and the vertical axis represents a three-phase PWM voltage pattern. The three-phase PWM voltage pattern includes (a) a maximum output voltage phase, (b) a middle output voltage phase, and (c) a minimum output voltage phase.

In the drawing, P1 indicates a code switching point of a reference input voltage. The waveform patterns of FIG. 2(a) to FIG. 2(c) after the code switching point P1 of the reference input voltage will now be described. FIG. 2(a) is fixed at a maximum input voltage Vmax after the code switching point P1 of the reference input voltage. On the other hand, FIG. 2(b) and FIG. 2(c) each use all three-phase input voltages to generate a PWM waveform. FIG. 2(b) shows the middle output voltage phase and FIG. 2(c) shows the minimum output voltage phase.

On the basis of a command for outputting a desired line voltage, a PWM waveform is generated by comparing with a triangular wave amplitude-modulated at a maximum line voltage value.

In the two-phase modulation, a phase of an input voltage having the largest absolute value is used as a reference value to perform control. The two-phase modulation is a method in which one of three phases is stopped and the remaining two phases are modulated, so that switching loss is reduced and high-efficiency operation is achieved.

When a reference voltage is a minimum voltage, a minimum phase of an output voltage is fixed and the remaining two output phases are PWM-controlled. As shown in FIG. 2, when a reference voltage is a maximum voltage, a maximum phase of an output voltage is fixed in a conduction state and the remaining two phases are PWM-controlled. The matrix converter simultaneously performs output voltage control and input current control. Here, the matrix converter uses all three input phases for an output voltage pattern to divide an input current, thereby performing input current control. In other words, input current control cannot be made without using all three input phases. The matrix converter outputs a voltage under a rule in which a connection to a maximum voltage or a minimum voltage is always made via a middle voltage.

FIG. 1 is a configuration diagram according to an embodiment of the present invention. As illustrated, there are provided a three-phase AC source 1, an input filter 2, a matrix converter main circuit 3, an input voltage detector group 4, a load motor 5 to be driven, a gate driver 6 for driving a bidirectional switch, and a controller 7 that performs a control operation. A matrix converter is a power converter that outputs any voltage or current by controlling the three-phase AC source 1 with a high-speed semiconductor switching element called "bidirectional switch", and thereby drives the load motor 5 with high efficiency and accuracy.

An internal configuration of the controller 7 for driving the matrix converter will now be described. As illustrated in FIG.

1, the controller 7 includes an analog-to-digital (A/D) converter 7-1, an output voltage calculating unit 7-2, an input voltage calculating unit 7-3, a PWM operation unit 7-4, and a commutation operation unit 7-5. The A/D converter 7-1 is used to take in an input voltage detected by the input voltage detector group 4 into the controller 7. The output voltage calculating unit 7-2 is for driving the load motor 5. The input voltage calculating unit 7-3 calculates an input voltage converted into a digital signal by the A/D converter 7-1. The PWM operation unit 7-4 determines timing of driving the bidirectional switch on the basis of calculation results obtained by the output voltage calculating unit 7-2 and the input voltage calculating unit 7-3. The commutation operation unit 7-5 realizes a commutation operation for allowing a current to continuously flow.

Figure 3:
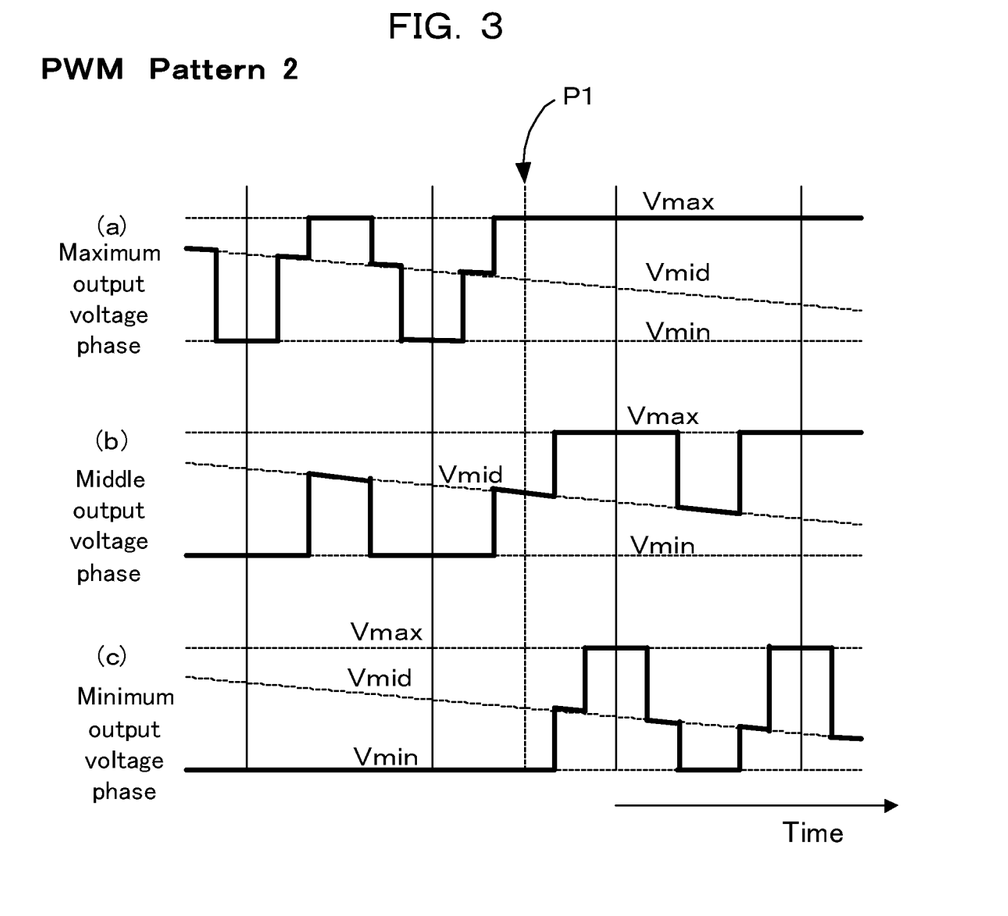
FIG. 3 shows a PWM pattern 2 (second mode) representing switching waveforms according to an embodiment of the present invention.

FIG. 3 shows a PWM pattern 2 (second mode) representing switching waveforms for realizing the present embodiment. The horizontal axis represents time and the vertical axis represents a three-phase PWM voltage pattern. The three-phase PWM voltage pattern includes (a) a maximum output voltage phase, (b) a middle output voltage phase, and (c) a minimum output voltage phase. FIG. 3(*a*) to FIG. 3(*c*) each represent an output voltage output from the matrix converter to the load motor 5. FIG. 3(*a*) is fixed at the maximum input voltage Vmax after the code switching point P1 of the reference input voltage. On the other hand, after the code switching point P1 of the reference input voltage, FIG. 3(*b*) uses the maximum input voltage Vmax and the middle input voltage Vmid to generate a PWM waveform, while FIG. 3(*c*) uses all three-phase input voltages to generate a PWM waveform.

The maximum output voltage phase of FIG. 3(*a*) and the minimum output voltage phase of FIG. 3(*c*) are the same as those in the PWM pattern 1 (first mode). Only the middle output voltage phase of FIG. 3(*b*) is PWM-controlled without using a minimum voltage potential.

Specifically, FIG. 3(*b*) can be generated by forcibly fixing a current division ratio α at a given numerical value, the current division ratio α being a ratio between a middle voltage and a maximum voltage.

This is advantageous in that the number of switching operations is reduced and voltage output accuracy is improved.

Figure 4:
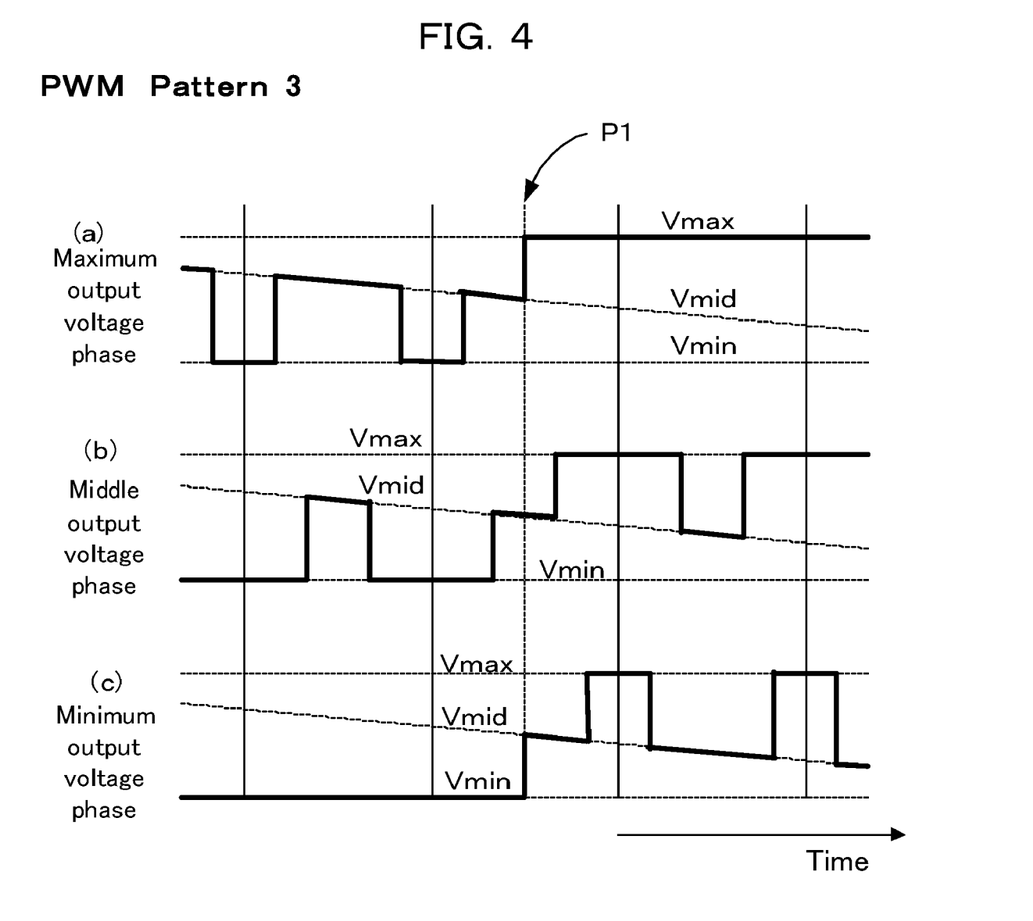
FIG. 4 shows a PWM pattern 3 (third mode) representing switching waveforms according to an embodiment of the present invention.

FIG. 4 shows a PWM pattern 3 (third mode) representing switching waveforms for realizing the present embodiment. FIG. 4(*a*) is fixed at the maximum input voltage Vmax after the code switching point P1 of the reference input voltage. On the other hand, after the code switching point P1 of the reference input voltage, FIG. 4(*b*) and FIG. 4(*c*) each use the maximum input voltage Vmax and the middle input voltage Vmid to generate a PWM waveform.

FIG. 4(*a*) to FIG. 4(*c*) can be generated by a method of comparing with an amplitude-modulated triangular wave to generate a PWM signal, and a method of forcibly fixing a current division ratio α at a given numerical value in the same manner as that of the PWM pattern 2.

Thus, as compared to the PWM pattern 2 (second mode) of FIG. 3, the voltage accuracy in the PWM pattern 3 (third mode) can be further improved.

Figure 5:
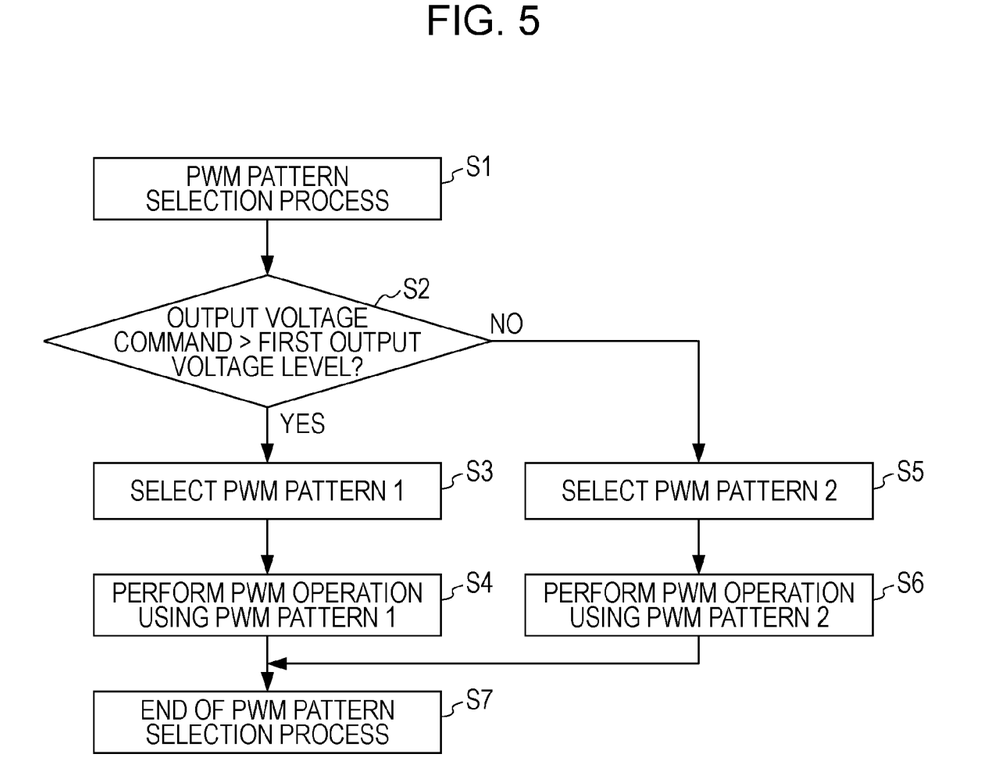
FIG. 5 is a first PWM operation flowchart according to an embodiment of the present invention.

FIG. 5 is a first PWM operation flowchart of the present embodiment. A PWM pattern selection process starts in step S1. In step S2, a determination is made as to whether the condition "output voltage command (Vref)>first output voltage level (V1)" is satisfied. If the condition is satisfied (YES in step S2), the process proceeds to step S3, where the PWM pattern 1 is selected. In step S4, a PWM operation is performed using the PWM pattern 1. If the condition is not satisfied (NO in step S2), the process proceeds to step S5, where the PWM pattern 2 is selected. In step S6, a PWM operation is performed using the PWM pattern 2. The PWM pattern selection process ends in step S7.

When the PWM pattern 2 (second mode) is used, since the rotation speed of the motor is low during low voltage output, which may affect voltage accuracy, the input current tends to be reduced. Therefore, a threshold level for the output voltage command is set in advance. Then, the PWM pattern 2 is used only when the output voltage command is smaller than or equal to the threshold level. Thus, the PWM pattern 2 (second mode) can be used during low voltage output, while the normal PWM pattern 1 (first mode) can be used during higher voltage output. This can reduce the impact of input current harmonic on a transit area etc. and improve voltage accuracy during transitional operation.

Figure 6:
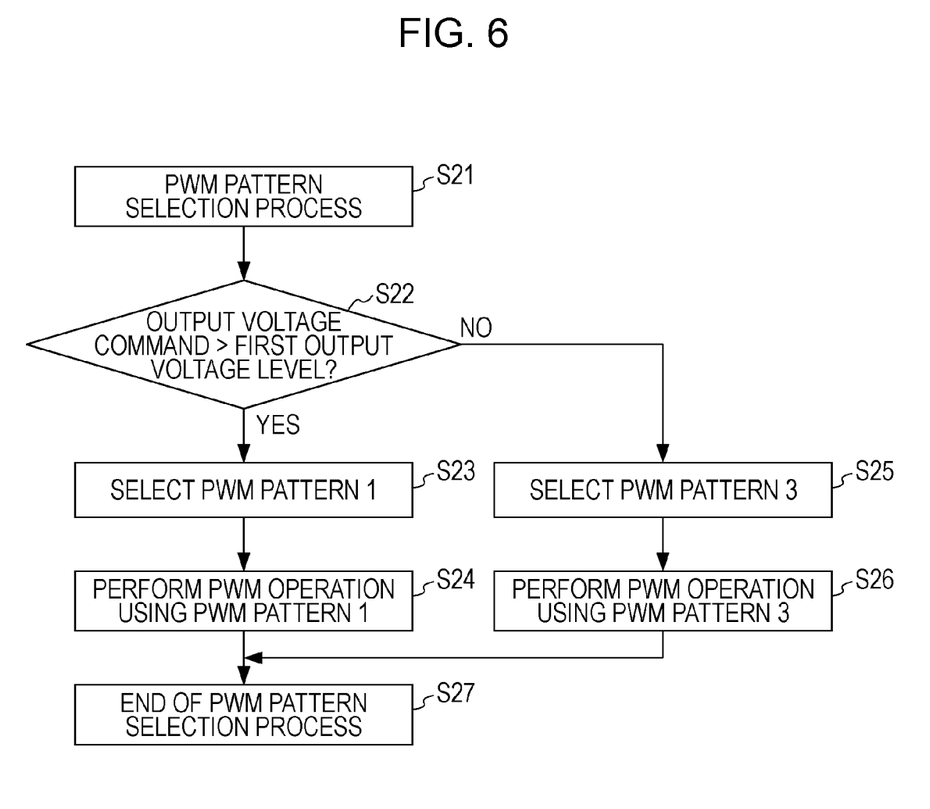
FIG. 6 is a second PWM operation flowchart according to an embodiment of the present invention.

FIG. 6 is a second PWM operation flowchart of the present embodiment. A PWM pattern selection process starts in step S21. In step S22, a determination is made as to whether the condition "output voltage command (Vref)>first output voltage level (V1)" is satisfied. If the condition is satisfied (YES in step S22), the process proceeds to step S23, where the PWM pattern 1 is selected. In step S24, a PWM operation is performed using the PWM pattern 1. If the condition is not satisfied (NO in step S22), the process proceeds to step S25, where the PWM pattern 3 is selected. In step S26, a PWM operation is performed using the PWM pattern 3. The PWM pattern selection process ends in step S27.

Thus, in a manner similar to that in FIG. 5, the PWM pattern 3 (third mode) having a larger impact is used, and a different PWM pattern is used depending on the voltage command.

Figure 7:
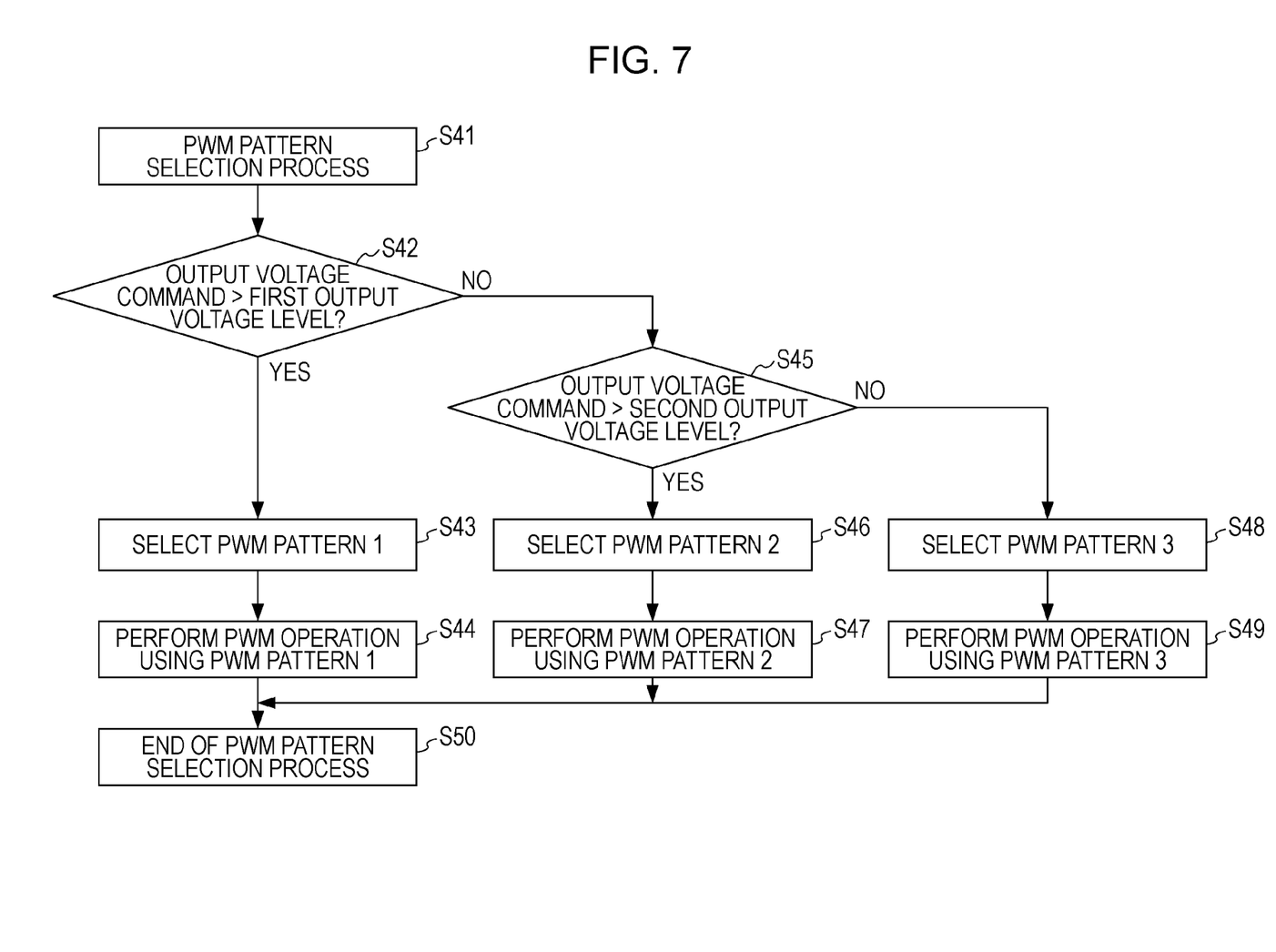
FIG. 7 is a third PWM operation flowchart according to an embodiment of the present invention.

FIG. 7 is a third PWM operation flowchart of the present embodiment. A PWM pattern selection process starts in step S41. In step S42, a determination is made as to whether the condition 1 "output voltage command (Vref)>first output voltage level (V1)" is satisfied. If the condition 1 is satisfied (YES in step S42), the process proceeds to step S43, where the PWM pattern 1 is selected. In step S44, a PWM operation is performed using the PWM pattern 1. If the condition 1 is not satisfied (NO in step S42), the process proceeds to step S45. In step S45, a determination is made as to whether the condition 2 "output voltage command (Vref)>second output voltage level (V2)" is satisfied, where the second output voltage level (V2) is smaller than the first output voltage level (V1). If the condition 2 is satisfied (YES in step S45), the process proceeds to step S46, where the PWM pattern 2 is selected. In step S47, a PWM operation is performed using the PWM pattern 2. If the condition 2 is not satisfied (NO in step S45), the process proceeds to step S48, where the PWM pattern 3 is selected. In step S49, a PWM operation is performed using the PWM pattern 3. The PWM pattern selection process ends in step S50.

The process illustrated in FIG. 7 is a combination of the processes illustrated in FIG. 5 and FIG. 6. By providing two output voltage levels as described above, it is possible to further stably drive a load in a transit area.

This process is also applicable to a method in which the second mode or the third mode is used only for tuning a motor which requires voltage accuracy, and to a method in which the second mode or the third mode is used only for detecting the speed of a load after the load is temporarily opened by instantaneous power failure etc.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A matrix converter comprising:
a matrix converter main circuit in which phases of an alternating current source are directly connected to their corresponding phases on an output side by a bidirectional switch having a self-arc-extinguishing capability;
an input voltage detector group configured to detect an input voltage of the alternating current source;
a gate driver configured to drive the bidirectional switch; and
a controller having a pulse width modulation operation unit and a commutation operation unit, the pulse width modulation operation unit being configured to fix one output phase in a conduction state for one switching period, configured to pulse-width-modulate one of remaining two output phases by using all three input voltages for the one switching period, and configured to pulse-width-modulate the other output phase by using only a reference input voltage and a middle input voltage of the three input voltages for the one switching period.

2. The matrix converter according to claim 1,
wherein the pulse width modulation operation unit is configured to compare an output voltage command with any predetermined output voltage level, and
wherein, if the output voltage command is greater than the output voltage level, the pulse width modulation operation unit is configured to pulse-width-modulate the remaining two output phases by using all the three input voltages.

3. A matrix converter comprising:
a matrix converter main circuit in which phases of an alternating current source are directly connected to their corresponding phases on an output side by a bidirectional switch having a self-arc-extinguishing capability;
an input voltage detector group configured to detect an input voltage of the alternating current source;
a gate driver configured to drive the bidirectional switch; and
a controller having a pulse width modulation operation unit and a commutation operation unit, the pulse width modulation operation unit being configured to fix one output phase in a conduction state, configured to pulse-width-modulate one of remaining two output phases by using all three input voltages, and configured to pulse-width-modulate the other output phase by using only a reference input voltage and a middle input voltage of the three input voltages,
wherein the pulse width modulation operation unit is configured to pulse-width-modulate the remaining two output phases by using only the reference input voltage and the middle input voltage of the three input voltages.

4. The matrix converter according to claim 3, wherein each output voltage phase of pulse width modulation is generated by comparing with a triangular wave amplitude-modulated between a maximum input voltage and the middle input voltage.

5. A matrix converter comprising:
a matrix converter main circuit in which phases of an alternating current source are directly connected to their corresponding phases on an output side by a bidirectional switch having a self-arc-extinguishing capability;
an input voltage detector group configured to detect an input voltage of the alternating current source;
a gate driver configured to drive the bidirectional switch; and
a controller having a pulse width modulation operation unit and a commutation operation unit, the pulse width modulation operation unit being configured to fix one output phase in a conduction state, configured to pulse-width-modulate one of remaining two output phases by using all three input voltages, and configured to pulse-width-modulate the other output phase by using only a reference input voltage and a middle input voltage of the three input voltages,
wherein the pulse width modulation operation unit is configured to compare an output voltage command with any predetermined output voltage level,
wherein, if the output voltage command is greater than the output voltage level, the pulse width modulation operation unit is configured to pulse-width-modulate the remaining two output phases by using all the three input voltages, and
wherein, if the output voltage command is smaller than or equal to the output voltage level, the pulse width modulation operation unit is configured to pulse-width-modulate the remaining two output phases by using only the reference input voltage and the middle input voltage of the three input voltages.

6. A matrix converter comprising:
a matrix converter main circuit in which phases of an alternating current source are directly connected to their corresponding phases on an output side by a bidirectional switch having a self-arc-extinguishing capability;
an input voltage detector group configured to detect an input voltage of the alternating current source;
a gate driver configured to drive the bidirectional switch; and
a controller having a pulse width modulation operation unit and a commutation operation unit, the pulse width modulation operation unit being configured to fix one output phase in a conduction state, configured to pulse-width-modulate one of remaining two output phases by using all three input voltages, and configured to pulse-width-modulate the other output phase by using only a reference input voltage and a middle input voltage of the three input voltages,
wherein the middle output voltage of pulse width modulation is generated by forcibly fixing a current division ratio at a given numerical value, the current division ratio being a ratio between the middle input voltage and a maximum input voltage.

7. A matrix converter comprising:
a matrix converter main circuit in which phases of an alternating current source are directly connected to their corresponding phases on an output side by a bidirectional switch having a self-arc-extinguishing capability;
an input voltage detector group configured to detect an input voltage of the alternating current source;
a gate driver configured to drive the bidirectional switch; and
a controller having a pulse width modulation operation unit and a commutation operation unit,
wherein the pulse width modulation operation unit is configured to compare an output voltage command with a predetermined first output voltage level and a predetermined second output voltage level smaller than the first output voltage level,
wherein, if output voltage command is higher than a first output voltage level which is higher than a second output voltage level, the pulse width modulation operation unit is configured to pulse-width-modulate two phases to be switched by using all three input voltages, wherein, if the output voltage command is lower than the first output voltage level and higher than the second output voltage level, the pulse width modulation operation unit is configured to fix one output phase in a conduction state, configured to pulse-width-modulate one of remaining two output phases by using all the three input voltages, and configured to pulse-width-modulate the other output phase by using only two input phases of a reference input voltage and a middle input voltage of the three input voltages, and wherein, if the output voltage command is lower than the second output voltage level, the pulse width modulation operation unit is configured to pulse-width-modulate the remaining two output phases by using only the reference input voltage and the middle input voltage of the three input voltages.

* * * * *